April 4, 1944.  E. W. GENT  2,345,967

PNEUMATIC TICKET DISTRIBUTING SYSTEM

Filed April 21, 1942  3 Sheets-Sheet 1

INVENTOR
E. W. GENT
BY J. MacDonald
ATTORNEY

April 4, 1944.　　　　E. W. GENT　　　　2,345,967
PNEUMATIC TICKET DISTRIBUTING SYSTEM
Filed April 21, 1942　　　3 Sheets-Sheet 2
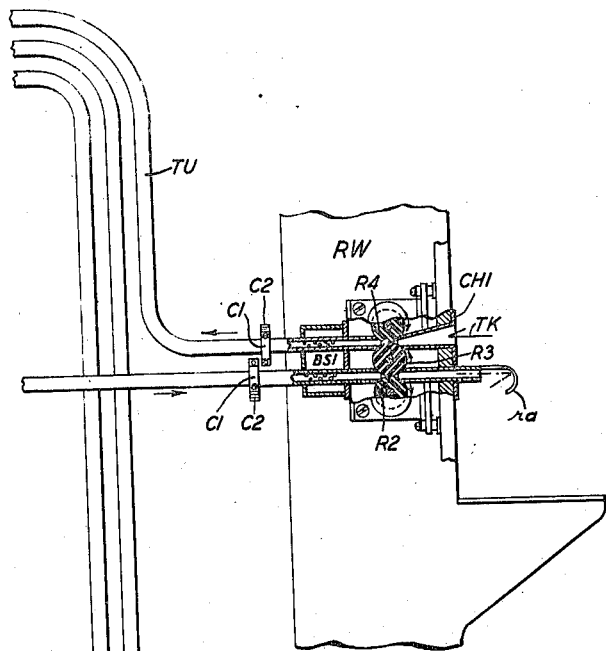
FIG. 2
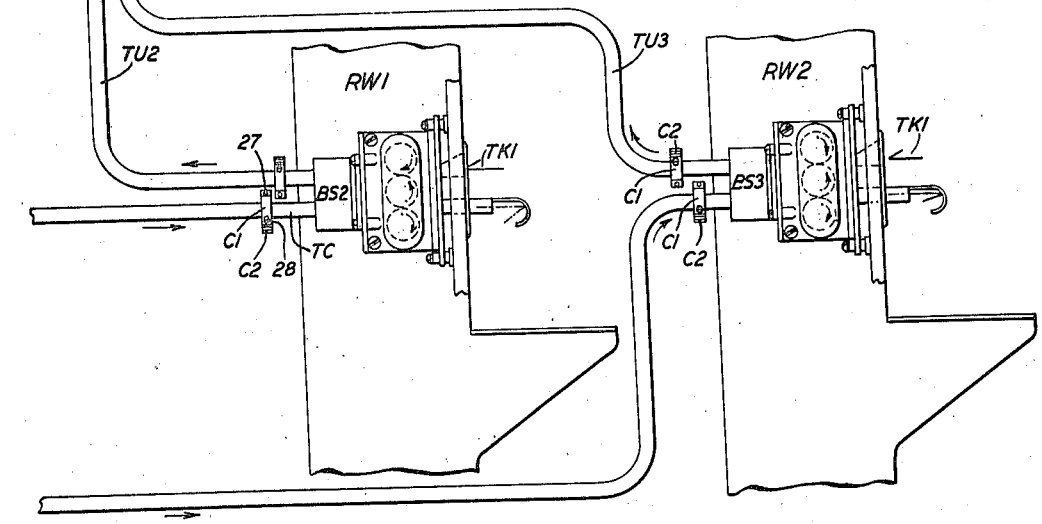
INVENTOR
E. W. GENT
BY J. MacDonald
ATTORNEY April 4, 1944. E. W. GENT 2,345,967
PNEUMATIC TICKET DISTRIBUTING SYSTEM
Filed April 21, 1942 3 Sheets-Sheet 3
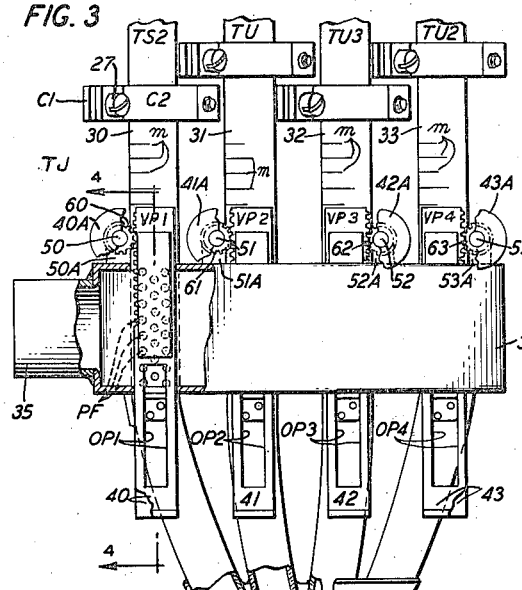
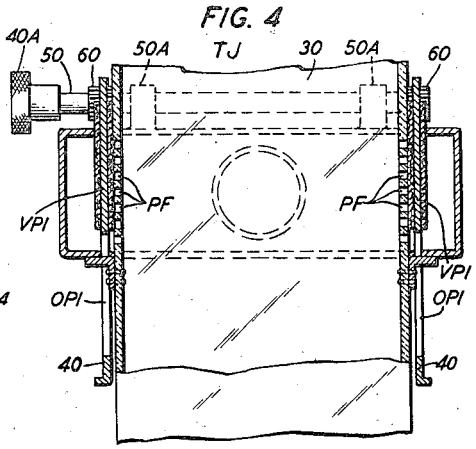
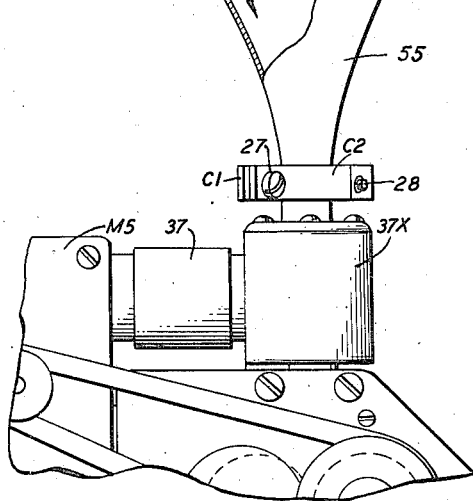
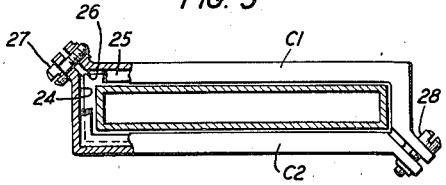
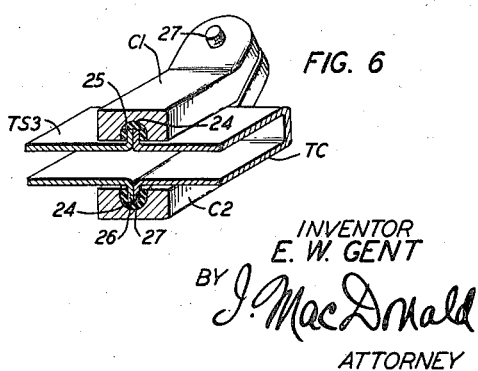
INVENTOR
E. W. GENT
BY J. MacDonald
ATTORNEY Patented Apr. 4, 1944

2,345,967

UNITED STATES PATENT OFFICE 2,345,967

PNEUMATIC TICKET DISTRIBUTING SYSTEM

Edgar W. Gent, Morristown, N. J., assignor to Bell Telephone Laboratories, Incorporated, New York, N. Y., a corporation of New York Application April 21, 1942, Serial No. 439,875

5 Claims. (Cl. 302—2)

This invention relates to pneumatic ticket distributing systems and more specifically to a pneumatic ticket distributing system for use, for example, for the distribution of toll tickets in telephone exchange systems and the like.

The object of the invention is to improve the operation of such pneumatic ticket distributing systems, simplifying their installation and decreasing their upkeep and manufacturing costs.

In the drawings:

Fig. 2 is a complemental view of Fig. 1 showing a number of combined ticket-receiving and sending valves with ticket-guiding tube connections to a tube junction connecting with the receiving valve shown in Fig. 1;

Fig. 3 is a partial enlarged view of the common ticket-receiving valve connected to the tube junction shown in Fig. 1 with the operating parts of slide valves actuating mechanisms shown with portions broken away and with the slide valves in adjusted positions;

Fig. 4 is a vertical sectional view taken on line 4—4 of Fig. 3 showing a pair of slide valves in one of a plurality of adjustable positions;

Fig. 4A is a view similar to Fig. 4 but with the adjustable slide valves shown in their normal positions;

Fig. 5 is a view of a clamping device, partly in section, used for connecting the adjacent ends of two ticket-guiding tubes; and Fig. 6 is a perspective view in section of the clamping device shown placed over a rubber band wound over the peripheral edges of the abutting ends of two ticket-guiding tubes.

Figure 1:
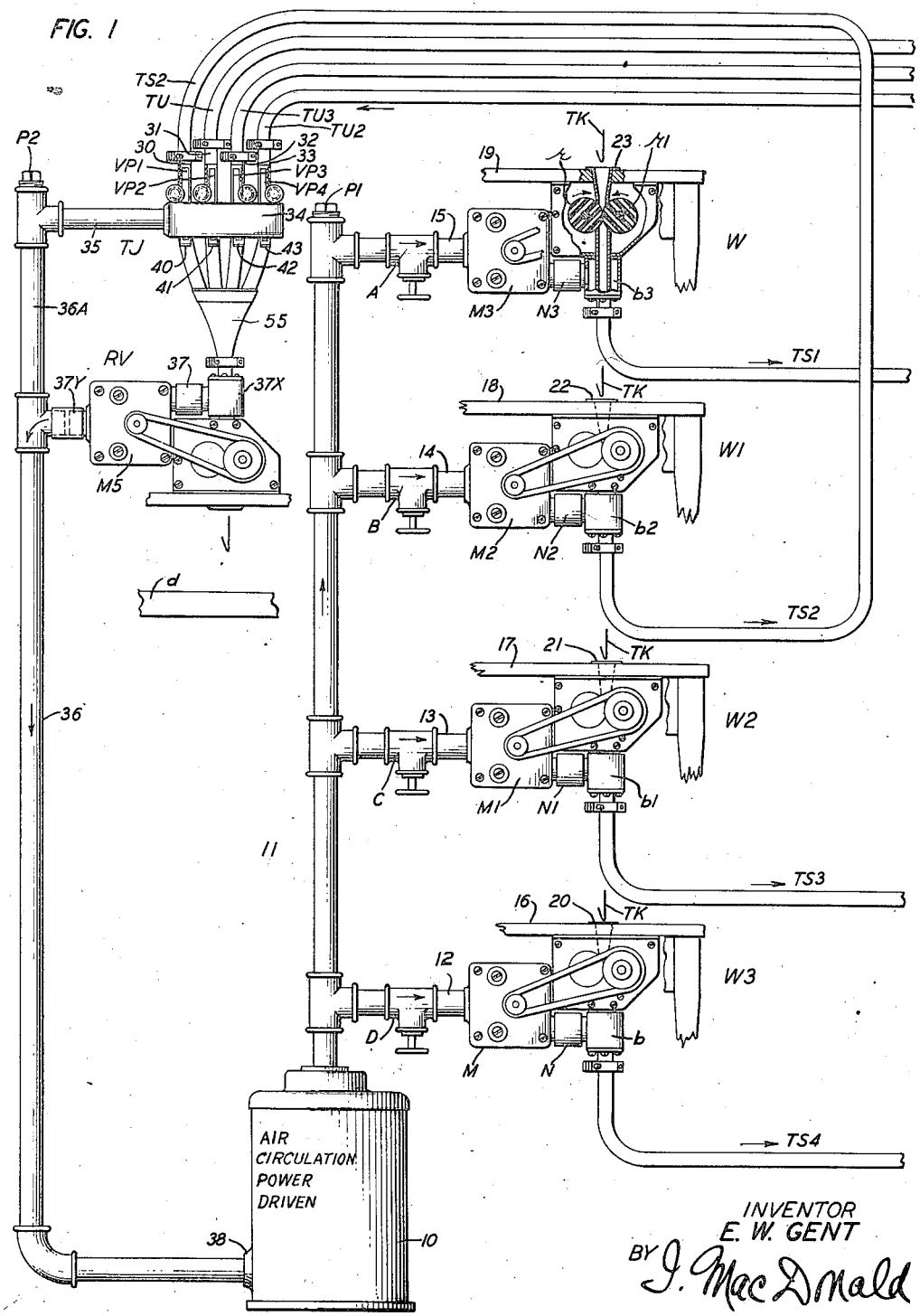
Fig. 1 is a layout showing a ticket-receiving valve and a plurality of ticket-sending valves placed at different operators' positions with connections to ticket-guiding tubes and to an air circulator.

As shown in the drawings, the pneumatic ticket distributing system of the invention may consist of any desired number of ticket-sending valves as W, W1, W2 and W3 connected as shown in Fig. 1 to a power-driven air circulator 10 of the vacuum cleaner type by a tubing 11 of circular cross section and branch tubings 12, 13, 14 and 15 which are in turn connected to casings M, M1, M2 and M3 serving for housing electric motors, not shown, provided for actuating the rollers as r and r1 of the receiving valves W, W1, etc., as by pulleys and belt connections, the streams of air from motor casings M, M1, M2 and M3 passing through tubing connections N, N1, N2, N3 and thence through by-pass chambers b, b1, b2 and b3 connecting with ticket-guiding tubes TS1, TS2, TS3 and TS4 of rectangular cross section, the rollers r and r1 of the receiving valves W, W1, W2 and W3 forming air seals at the ends of tubes TS1, TS2, etc., while a plug P1 (shown in Fig. 1) closes the opposite end of tubing 11.

The valves W, W1, W2 and W3 are each secured to the underside of a mounting board or table, as 16, 17, 18 and 19, placed at different operators' positions with the ticket chutes 20, 21, 22 and 23 of the valves W3, W2, W1 and W extending in openings through the mounting boards in position shown in Fig. 1 for receiving the tickets as TK to be dispatched through the rotation of rollers r and r1 of each valve W, W1, W2 and W3 and the propelling effect of the flow of air in ticket-guiding tubes TS1, TS2, TS3 and TS4 of rectangular cross sections connecting at remotely placed combined ticket-receiving and sending valves RW, RW1 and RW2 in turn connected to the by-pass chambers bs1, bs2 and bs3 by similar pairs of clamping elements C1 and C2, best seen in Figs. 5 and 6, having inwardly formed grooves at 24 fitting over a rubber band 25 wound under tension around the peripheral edges of flanges 26 and 27 of the abutting ends of ticket-guiding tubes as TS3 and TC connecting the sending valve W2 with the combined receiving and sending valves RW1, the clamping elements being firmly secured in position thereon under the tightening effect of screws 27 and 28.

The sending sides of the combined valves RW, RW1 and RW2, shown in Fig. 2, are connected to a tube junction TJ shown in Figs. 1 and 3 through their air by-pass chambers BS1, BS2 and BS3 and pneumatic ticket-guiding tubes TU, TU2 and TU3 while in certain operating conditions of the system the ticket-sending valve W1 is connected directly to tube junction TJ by ticket-guiding tube TS2. Tube junction TJ as shown in Figs. 1 and 3 and in vertical sections in Figs. 4 and 4A consists of guiding tube connections 30, 31, 32, 33 secured to or formed integrally with the wall of an air by-pass chamber 34 while a tubing 35 of circular cross section connects this by-pass chamber to a tubing branch 36A in turn connecting with return tubing 36 leading to the air circulator 10 by connection 38, the stream of air from the constricted end 55 of tube junction TJ passing through by-pass chamber 37X, the connection 37, the motor housing M5 and the tubing connection 37Y to the return tubing 36 and thence to the air circulator 10, while a plug P2 (shown in Fig. 1) closes the opposite end of tubing 36.

The air pressure variations in the ticket-guiding tubes TS1, TS2, TS3 and TS4, and TU, TU2 and TU3 may be compensated by the adjustment of slide valves or vanes in the form of pairs of metallic strips 40—40, 41—41, 42—42 and 43—43 mounted (as shown in Figs. 1, 3, 4 and 5) for longitudinal movement against the narrow sides of tube sections 30, 31, 32 and 33 guided in slots in the wall of by-pass casing 34, these valves being formed with rectangular openings OP1, OP2, OP3 and OP4 and vane portions VP1, VP2, VP3 and VP4, best seen in Figs. 1, 3, 4 and 4A provided for a purpose which will be hereinafter described in detail.

The valve strips 40—40, 41—41, 42—42 and 43—43 of each tube section 30, 31, 32 and 33 are arranged to be moved by pairs from their non-operated position shown in Fig. 4A to one of the positions as indicated by the marks $m$ printed on the tube sections 30, 31, 32 and 33 in Fig. 3 by the turning movement of knobs 40A, 41A, 42A and 43A keyed to one end of their supporting shafts 50, 51, 52 and 53, respectively, journaled in pairs of bearings at 50A, 51A, 52A and 53A, formed with the tubing sections 30, 31, 32 and 33, respectively, each shaft having a pair of pinions as 60—60, 61—61, 62—62, 63—63 engaging with the gear rack portions formed at similarly disposed edges of valve strips 40—40, 41—41, 42—42 and 43—43 for moving them from open positions where the openings OP1 of these sliding strips register with the series of perforation PF at the narrow sides of tubing sections 30, 31, 32 and 33 to any one of the positions indicated by the graduation marks $m$ for partially closing the openings PF and thereby controlling the velocity of the flow of air in the tubes and consequently the speed of the tickets relative to the peripheral speed of the rollers at the receiving sides of valves RW, RW1, RW2 of the combined receiving and sending valves and to the peripheral speed of the rollers of the receiving valves RV connected to the constricted end of the tube junction TJ.

In an example of operation of the pneumatic ticket distributing system of the invention, with the air circulator 10 operating, a stream of air is generated and moving at a predetermined velocity in the tube 11 in the direction indicated by the arrows in Fig. 1, and into the branch tubings 12, 13, 14 and 15, passing into the casings M, M1, M2 and M3, the connections N, N1, N2, N3, the by-pass chambers $b$, $b1$, $b2$ and $b3$ of sending valves W3, W2, W1 and W connected as above described to the combined receiving and sending valves RW2, RW1 and RW by the ticket-guiding tubes TS4, TS3 and TS1, while the ticket-guiding tube TS2 connects direct to the ticket-receiving valve RV through the junction tube TJ.

The streams of air from the tubings TS1, TS2, TS3 and TS4 moving in a direction of the arrows shown in Figs. 1 and 2 pass through the by-pass chambers BS1, BS2 and BS3 of the combined valves RW, RW1 and RW2 and thence to the ticket-receiving valve RV by ticket-guiding tubes TU, TU2 and TU3 and, as above mentioned, the sending valve W1 with ticket-guiding tube TS2 connecting with the valve RV through the tubing junction TJ, the air returning to the tube 36 through the adjustable sliding strips or valves of by-pass chambers 34 and 37X, the casing M5 of this valve and the return tube 36 connected as above mentioned to the air circulator 10, the streams of air passing into the casings M, M1, M2 and M3 and M5 being effective to cool the motors of these valves while in operation. A ticket TK placed into chute 23 of sending valve W, for example, will be gripped by the operation of the rollers $r$ and $r1$ and moved thereby into the adjacent end of ticket-guiding tube TS1 from which the stream of air in this tube will impart a movement to the ticket to a point against the periphery of rollers R2 and R3 forming the receiving side of combined valve RW, the rollers $r2$ and $r3$ rotating in the direction indicated by the arrows in Fig. 2 being effective to drive the ticket onto the receiving rack $ra$ of this valve at the front of the operator's position.

The ticket TK received by valve RW following its proper identification by the telephone operator is sent to receiving valve RV for collection by introducing it into the chute CH1 of valve RW forming the sending side thereof, such a ticket being gripped by the rollers R3 and R4 turning in the direction indicated by the arrow in Fig. 2 and driven into the ticket-guiding tube TU having its opposite end connected to the tube junction TJ and against the periphery of the rollers in the receiving valve RV from which it falls as by gravity onto the desk $d$ of this operator's position.

Supposing now that a blockade of tickets occur, for example, at any point along the ticket-guiding tube TU, an increased air pressure and velocity of the air streams will occur in the ticket-sending tubes TU2 and TU3 and into ticket-guiding tubes TS2 resulting in the travel of the tickets in these tubes at a greater velocity than that of the peripheral speed of the delivery rollers of valve RV thus requiring the adjustment of slidable valves 40—40, 42—42, 43—43. This adjustment is effected by the rotation of shafts 50, 52 and 53 (Figs. 3, 4 and 4A) by knob 40A, 42A and 43A, respectively, for rotating the sets of pinions 60, 62 and 63 carried by these shafts and thereby moving the slide valves 40—40, 42—42 and 43—43 through the engagement of their gear rack portions with the set of pinions for positioning these slide valves to the required position as indicated by the marks printed on the junction tube sections 30, 31, 32 and 33 best seen in Fig. 3, thus reducing the velocity of the air streams in their respective ticket-guiding tubes to values corresponding to the peripheral velocity of the rollers of valve RV acting on the ticket to be delivered on the board of the operator's position $d$, the operation of sliding valves by pairs 40—40, 41—41, 42—42 and 43—43 preventing the stoppage of the tickets at the by-pass of the tube junction 34 by avoiding being drawn to one side thereof as would follow upon the individual operation of these valves due to the unbalanced air velocity which would result at these points.

The air cut-off valve A of branch tubing 15 is closed following the closing of sliding valves 41 of tube TU so as to prevent any escape of air in this guiding tube while being dismantled by the removal of the necessary clamping devices C1 and C2 at the ends of the ticket tube section affected, air cut-off valves B, C and D being provided for closing the flow of air to ticket sending tube TS2, TS3 and TS4 in the manner above described in connection with ticket sending tube TU connected to ticket sending valve W by ticket sending tube TS1 whenever blockades occur in these tubes.

What is claimed is:

1. A pneumatic ticket distributing system comprising an air circulator, a main tubing having branches, a plurality of roller ticket-sending valves having casings connected to the branches of said tubing, a motor in each of said casings for actuating the rollers of said sending valves, an air by-pass element for each of said sending valves connecting with said casings, ticket-guiding tubes, and combined ticket-sending and receiving valves connected to the opposite ends of said ticket-guiding tubes, the streams of air passing into said casings cooling said motors.

2. A pneumatic ticket distributing system comprising an air circulator, a main tubing connecting at one end to said circulator and having a plurality of tubing branches, a plurality of roller sending valves connecting with said tubing branches, a plurality of combined roller sending and receiving valves, ticket-guiding tubes interconnecting said roller sending and said roller sending and receiving valves, a receiving valve, a tube junction having its constricted end connected to said receiving valve, ticket-guiding tubes connecting the sending sides of said sending and receiving valves to said tube junction, individually operable mechanism adjustable for controlling the speed of the air stream in each of the first and second-mentioned guiding tubes at said tube junctions, means for indicating the adjusted position of each of said mechanisms, and a return tube connecting said receiving valve to said air circulator in a closed circuit arrangement.

3. A pneumatic ticket distributing system comprising an air circulator, a main tubing having one of its ends connected to said circulator, ticket-sending valves having chutes for receiving the ticket to be transmitted, tubing branches connecting said ticket-sending valves to said main tubing, said sending valves having air by-pass elements, ticket-guiding tubes connecting at one of their ends to said by-pass elements in axial alignment with said chute, combined ticket-sending and receiving valves having air by-pass elements connecting with the opposite end of said ticket-guiding tubes, rollers in said sending valves for driving the tickets from said chutes into said guiding tubes, rollers in said sending and receiving valves for driving the tickets out of said guiding tubes and forming air seals at the end of said ticket guiding tubes, a tube junction, other ticket tubes connecting with said tube junction and having their other ends connected to the air by-pass of said sending and receiving valves in axial alignment with the sending side of the combined sending and receiving valves, and a receiving valve connected to the constricted end of said tube junction having an air by-pass element connecting said air circulator through a tubing connecting with the motor casing of the last-mentioned receiving valve.

4. A pneumatic ticket distributing system comprising a plurality of ticket-sending valves, a plurality of combined sending and receiving valves, ticket-guiding tubes interconnecting said sending valves to the receiving side of said combined valves, a receiving valve, a tube junction, ticket-guiding tubes having one of their ends connecting with the sending end of said combined valves and their other ends to said tube junction, an air by-pass common to said tube junction, and adjustable means for controlling the air flow from said tube junction to said receiving valve.

5. In a pneumatic ticket distributing system, a tube junction having an air by-pass, a plurality of ticket-guiding tubes having one of their ends connected to said tube junction a plurality of combined receiving and sending valves having their sending sides connected to the other ends of said ticket-guiding tubes, a receiving valve connected to the constricted end of said junction and having rollers for delivering the tickets, a plurality of adjustable means for controlling the flow of air from said ticket-guiding tubes to said receiving valve, each of said adjustable means comprising a plurality of air paths leading from the tube junction to said by-pass, longitudinally movable strips for varying the area of said air paths, said strips having gear rack portions, a shaft for each pair of said strips, a pair of pinions carried by each of said shafts engaging a pair of said strips for simultaneous operation and a knob carried by each of said shafts for rotating them to move said strips in position for adjusting the flow of air in each of said ticket-guiding tubes to values corresponding to the peripheral speed of the rollers in said receiving valve.

EDGAR W. GENT.